US009428195B1

(12) United States Patent
Surpi (10) Patent No.: US 9,428,195 B1
(45) Date of Patent: Aug. 30, 2016

(54) BACK-END EVENT RISK ASSESSMENT WITH HISTORICAL COACHING PROFILES (71) Applicant: Lytx, Inc., San Diego, CA (US)

(72) Inventor: Gabriela Surpi, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 14/340,426

(22) Filed: Jul. 24, 2014

(51) Int. Cl.
*B60W 40/09* (2012.01)
*G07C 5/08* (2006.01)
*G07C 5/00* (2006.01)

(52) U.S. Cl.
CPC ............ *B60W 40/09* (2013.01); *G07C 5/008* (2013.01); *G07C 5/085* (2013.01)

(58) Field of Classification Search
CPC ...... B60W 40/09; G07C 5/085; G07C 5/008
See application file for complete search history.

(56) References Cited

U.S. PATENT DOCUMENTS

| | | | |
|---|---|---|---|
| 6,405,132 B1 | 6/2002 | Breed et al. | |
| 6,556,905 B1 | 4/2003 | Mittelsteadt et al. | |
| 6,720,920 B2 | 4/2004 | Breed et al. | |
| 6,768,944 B2 | 7/2004 | Breed et al. | |
| 7,085,637 B2 | 8/2006 | Breed et al. | |
| 8,930,072 B1* | 1/2015 | Lambert | G07C 5/0866 348/222.1 |
| 2002/0105423 A1 | 8/2002 | Rast | |
| 2005/0065716 A1 | 3/2005 | Timko et al. | |
| 2006/0058950 A1 | 3/2006 | Kato et al. | |
| 2006/0095175 A1* | 5/2006 | deWaal | G07C 5/008 701/31.4 |
| 2006/0129283 A1 | 6/2006 | Alewine et al. | |
| 2007/0257804 A1* | 11/2007 | Gunderson | G07C 5/0891 340/576 |
| 2007/0271105 A1* | 11/2007 | Gunderson | G06Q 10/087 705/1.1 |
| 2007/0276582 A1* | 11/2007 | Coughlin | B60W 40/09 701/123 |
| 2009/0096604 A1 | 4/2009 | Battista | |
| 2010/0157061 A1* | 6/2010 | Katsman | G07C 5/0866 348/149 |
| 2010/0238009 A1* | 9/2010 | Cook | G06Q 10/10 340/439 |
| 2010/0250021 A1* | 9/2010 | Cook et al. | 701/1 |
| 2012/0221216 A1* | 8/2012 | Chauncey | B60R 16/0236 701/51 |
| 2012/0232747 A1* | 9/2012 | Miners | G07C 5/006 701/33.9 |
| 2013/0173129 A1* | 7/2013 | Syed | B60W 40/09 701/70 |
| 2015/0088335 A1* | 3/2015 | Lambert | G08G 1/162 701/1 |
| 2015/0258996 A1* | 9/2015 | Victor | G09B 19/16 340/576 |

FOREIGN PATENT DOCUMENTS

WO 2007109091 A2 9/2007

OTHER PUBLICATIONS

Lambert et al. U.S. Appl. No. 14/037,815, filed Sep. 26, 2013.

* cited by examiner

*Primary Examiner* — Jonathan M Dager
(74) *Attorney, Agent, or Firm* — Van Pelt, Yi & James LLP (57) ABSTRACT

A system for transferring data comprises an input interface and a processor. The input interface is configured to receive event information from a vehicle event recorder including an event type for each event associated with the event information. The processor is configured to determine a historical coachable profile for event types associated with the event information and select a group of events to transfer based at least in part on the historical coachable profile for the event types.

25 Claims, 8 Drawing Sheets

Fig. 1

| Vehicle Identifier | Hard Driving Events | Out Of Control Events | Rough Road Events | Shock And Erratic Events | Flat Tire Events |
|---|---|---|---|---|---|
| 1000 | 0 (0) | 1 (1) | 0 (0) | 3 (2) | 1 (0) |
| 1001 | 0 (0) | 0 (0) | 0 (0) | 0 (0) | 0 (0) |
| 1002 | 0 (0) | 0 (0) | 2 (0) | 0 (0) | 7 (2) |
| 1003 | 2 (1) | 5 (5) | 0 (0) | 7 (5) | 0 (0) |
| 1004 | 0 (0) | 0 (0) | 0 (0) | 0 (0) | 0 (0) |
| 1005 | 9 (6) | 0 (0) | 8 (1) | 0 (0) | 0 (0) |
| 1006 | 0 (0) | 2 (2) | 0 (0) | 9 (6) | 0 (0) |
| 1007 | 0 (0) | 0 (0) | 1 (0) | 0 (0) | 0 (0) |
| 1008 | 0 (0) | 0 (0) | 0 (0) | 2 (1) | 0 (0) |
| 1009 | 1 (0) | 0 (0) | 9 (0) | 0 (0) | 0 (0) |
| 1010 | 0 (0) | 0 (0) | 0 (0) | 8 (4) | 0 (0) |
| 1011 | 0 (0) | 1 (1) | 0 (0) | 4 (3) | 3 (1) |
| 1012 | 0 (0) | 0 (0) | 0 (0) | 0 (0) | 0 (0) |
| 1013 | 6 (1) | 0 (0) | 0 (0) | 5 (3) | 4 (1) |
| 1014 | 0 (0) | 4 (4) | 0 (0) | 0 (0) | 4 (1) |
| 1015 | 7 (3) | 0 (0) | 0 (0) | 0 (0) | 0 (0) |

200    Events (Coachable Events)

BACK-END EVENT RISK ASSESSMENT WITH HISTORICAL COACHING PROFILES

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, global positioning system (GPS), etc., that report data, which is used to determine the occurrence of an anomalous event. Sensor data can be used to detect accidents, record accident details, etc. In addition, sensor data can be used to detect driver behavior in need of improvement (e.g., aggressive driving, hardstops, failure to signal a turn, dangerous turns, etc.).

BRIEF DESCRIPTION OF THE DRAWINGS

Various embodiments of the invention are disclosed in the following detailed description and the accompanying drawings.

FIG. 5 is a flow diagram illustrating an embodiment of a vehicle event recorder check in.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for back-end event risk assessment with historical coaching profiles is disclosed. The system comprises an input interface and a processor. The input interface is configured to receive event information from a vehicle event recorder including an event type for each event associated with the event information. The processor is configured to determine a historical coachable profile for event types associated with the event information and select a group of events to transfer based at least in part on the historical coachable profile for the event types.

In some embodiments, a system for back-end event risk assessment with historical coaching profiles comprises an input interface configured to receive a manifest with information on events from a vehicle event recorder including an event type for each event in the manifest, and a processor configured to determine historical information including prior number of events downloaded and coaching profile (e.g., including the assessment of coachable percentages) found for event types associated with the event manifest and to select a group of events to download based at least in part on the historical information for the event types. The system for additionally comprises a memory coupled to the processor and configured to provide the processor with instructions.

In some embodiments, a vehicle including a vehicle event recorder checks in with a home station (e.g., a depot, a fleet yard, etc.) that has a connection to a vehicle data server. In some embodiments, the vehicle event recorder checks in with the home station via a wireless data connection. In some embodiments, a vehicle event recorder communicates with a vehicle data server using a cellular network or any other appropriate network or combination of networks. The vehicle event recorder stores a set of events including event data that have been recorded over the course of a driving shift. In various embodiments, event data comprises sensor data, audio data, video data, vehicle data, time data, or any other appropriate data. Events of the set of events each include an associated event type. In some embodiments, an event type is determined by analyzing event data. Event data can be used by the vehicle data server for coaching a driver (e.g., for identifying driving problems and potential solutions). In some embodiments, only some events are useful for coaching (e.g., some events are not the fault of the driver, some events are only a minor problem, etc.).

In some embodiments, downloading capacity is limited (e.g., downloading events comes at a cost—for example, a time cost, a dollar cost, etc.), so it is advantageous to avoid downloading full events that are not useful for coaching. The risk assessment estimates the probability that an event will be useful for coaching from a subset of the event's data available at the vehicle event recorder and that includes event type. The probability that an event is coachable is determined for each event type based on historical data. Event type coaching probabilities can then be used to prioritize events of different types to download. In some embodiments additional data provided from external sources (e.g., weather conditions, traffic conditions, etc.) and/or data gathered during the event (e.g., time, speed, other sensors readings, etc.) are used to improve the risk assessment and prioritization. In some embodiments, the number of events per vehicle to download is adjusted based on a fleet capacity (e.g., a total download budget for the fleet) and/or a vehicle download history. For example, an average number of events (e.g., fleet capacity divided by the number of vehicles in the fleet) is targeted for to download from each vehicle. In some embodiments, the vehicle download history is used to determine if more than enough information has been downloaded from a specific vehicle in the past, and thus fewer events should be downloaded now; or if not enough information has been downloaded from the vehicle in the past, and thus more events should be downloaded now.

In some embodiments, the back-end risk assessment of the probability that an event will contain a coachable behavior is used to prioritize the queue of downloaded events that await manual review.

Figure 1:
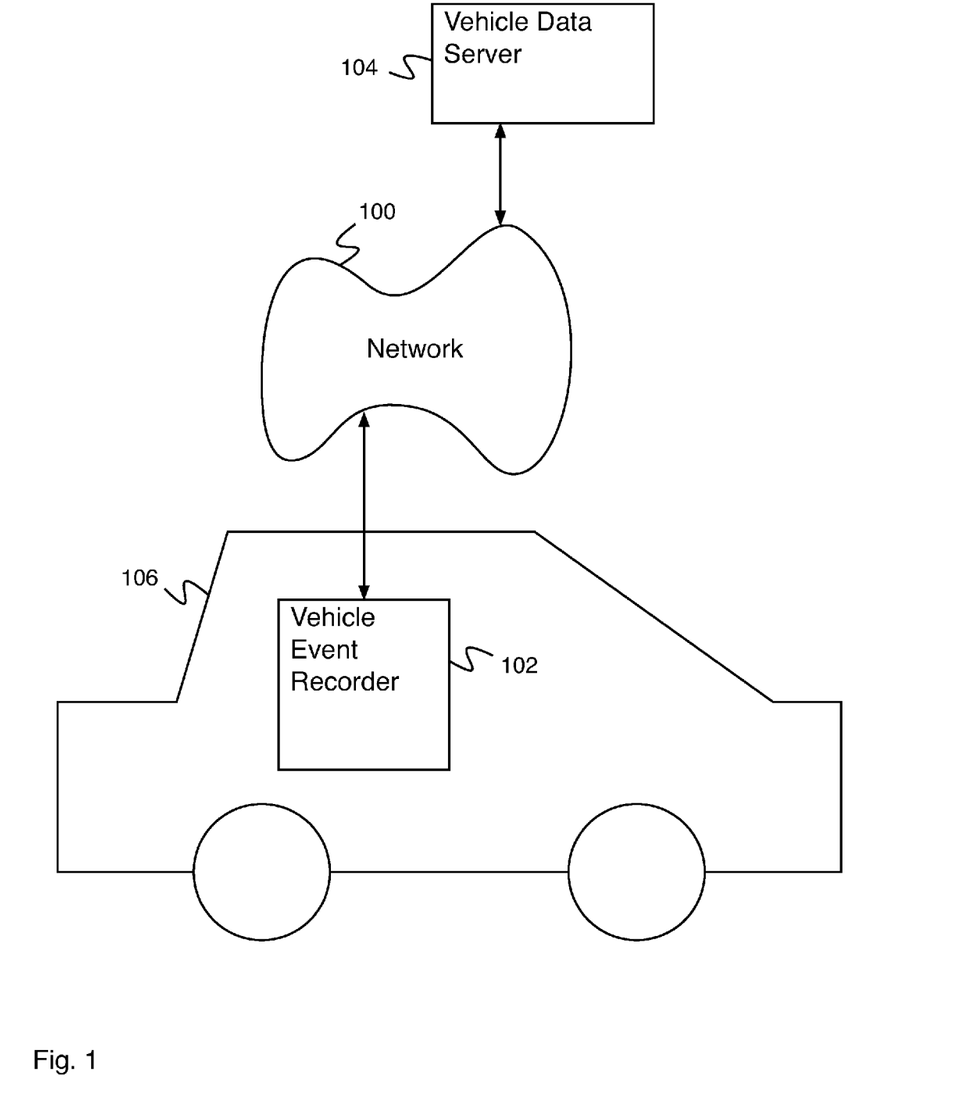
FIG. 1 is a block diagram illustrating an embodiment of a system including a vehicle event recorder.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, cameras, video recorders, audio recorders, accelerometers, gyroscopes, vehicle state sensors, global positioning system (GPS), outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In various embodiments, vehicle event recorder 102 comprises a system for detecting risky behavior, for detecting risky driving, for uploading anomalous driving events, for coaching a driver, or for any other appropriate purpose. In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a code division multiple access (CDMA) network, a global system for mobile communications (GSM) network, a local area network, a wide area network, the Internet, or any other appropriate network. Vehicle event recorder 102 communicates with back-end vehicle data server 104 via network 100. Vehicle event recorder 102 is mounted on vehicle 106. In various embodiments, vehicle 106 comprises a car, a truck, a commercial vehicle, or any other appropriate vehicle. Back-end vehicle data server 104 comprises a vehicle data server for collecting events and risky behavior detected by vehicle event recorder 102. In some embodiments, back-end vehicle data server 104 comprises a system for collecting data from multiple vehicle event recorders. In some embodiments, back-end vehicle data server 104 comprises a system for analyzing vehicle event recorder data. In some embodiments, back-end vehicle data server 104 comprises a system for displaying vehicle event recorder data. In some embodiments, back-end vehicle data server 104 is located at a home station (e.g., a shipping company office, a taxi dispatcher, a truck depot, etc.). In some embodiments, events recorded by vehicle event recorder 102 are downloaded to back-end vehicle data server 104 when vehicle 106 arrives at the home station. In some embodiments, back-end vehicle data server 104 is located at a remote location from a home station. In some embodiments, back-end vehicle data server 104 comprises an interface to receive event information including an event type.

Figure 2:
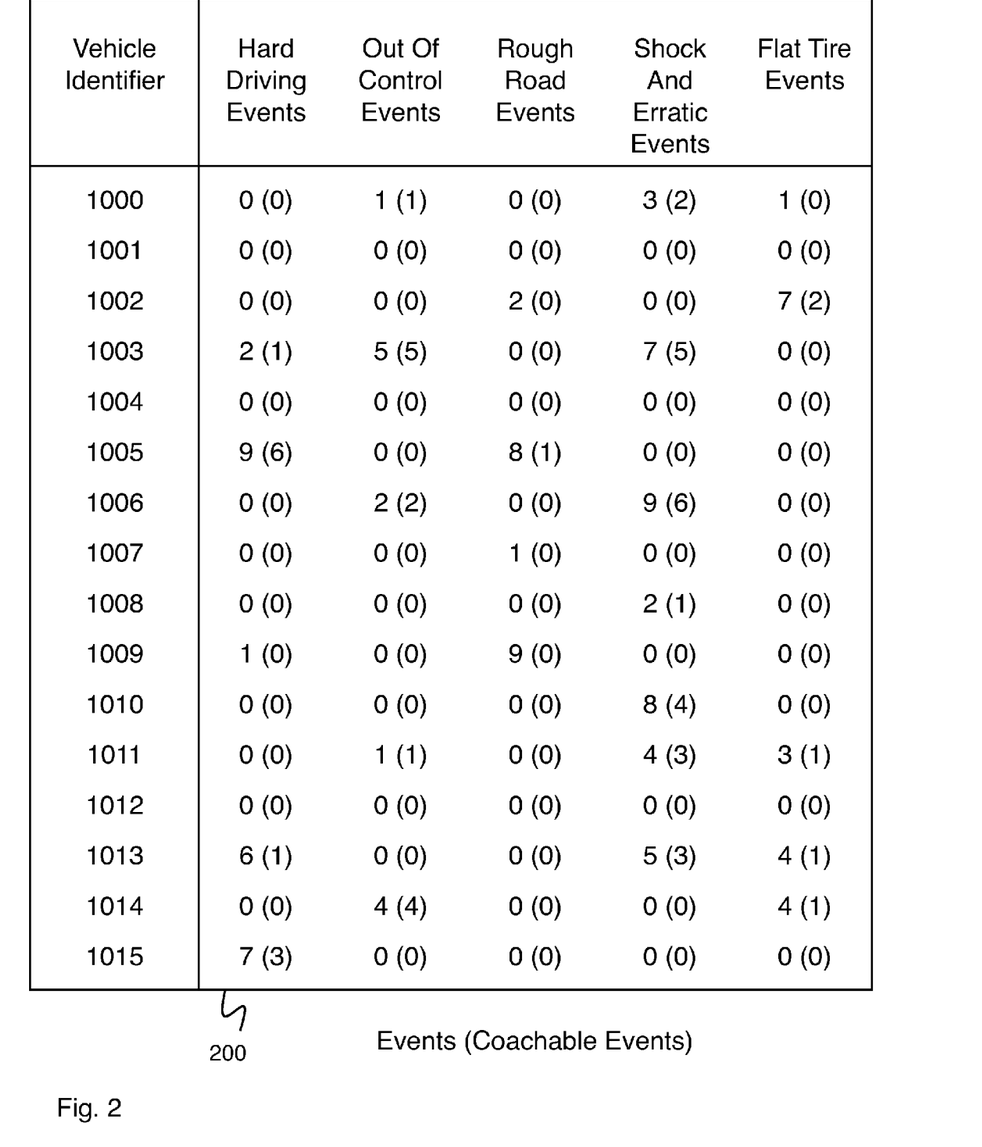
FIG. 2 is a diagram illustrating an embodiment of an event table.

FIG. 2 is a diagram illustrating an embodiment of an event table. In some embodiments, event table 200 comprises a table of events collected by a back-end vehicle data server (e.g., back-end vehicle data server 104 of FIG. 1) from a set of vehicles including vehicle event recorders (e.g., vehicle event recorder 102 of FIG. 1). In the example shown, event table 200 comprises data for a set of vehicles, each vehicle identified by a vehicle identifier, collected during the last 14 days. A set of anomalous events is associated with each vehicle. In various embodiments, the set of anomalous events comprises a set of events collected over one day, one week, one month, or any other appropriate period of time. Each event comprises an associated event type. In the example shown, event types comprise hard driving events, out of control events, rough road events, shock and erratic events, and flat tire events. In some embodiments, a vehicle event recorder determines an event type for an event before transmitting the event to the back-end vehicle data server. When a back-end vehicle data server receives an event, the probability that the event is coachable is determined by doing a risk assessment. In some embodiments, an event comprises a coachable event if the event reveals a driver behavior that can be coached. In various embodiments, an event is determined to be coachable by an event reviewer at a reviewing station, by an automatic software program, by a committee, by a combination of human and software reviewers, or by any other appropriate event reviewer. In the example shown, each vehicle comprises an associated set of past events and coachable events collected over a given period of time. A set of coachable events comprises a subset of a set of events (e.g., for the vehicle associated with vehicle identifier 1003, 7 shock and erratic events are collected, 5 of which are determined to be coachable). Vehicles 1003, 1005, 1009, 1013, and 1015 have 2, 9, 1, 6, and 7 hard driving events with 1, 6, 0, 1, and 3 coachable events, respectively. Vehicles 1000, 1003, 1006, 1011, and 1014 have 1, 5, 2, 1, and 4 out of control events with 1, 5, 2, 1, and 4 coachable events, respectively. Vehicles 1002, 1005, 1007, and 1009 have 2, 8, 1, and 9 rough road events with 0, 1, 0, and 0 coachable events, respectively. Vehicles 1000, 1003, 1006, 1008, 1010, 1011, and 1013 have 3, 7, 9, 2, 8, 4, and 5 shock and erratic events with 2, 5, 6, 1, 4, 3, and 3 coachable events, respectively. Vehicles 1000, 1002, 1011, 1013, and 1014 have 1, 7, 3, 4, and 4 flat tire events with 0, 2, 1, 1, and 1 coachable events, respectively.

In some embodiments, the set of vehicles shown in event table 200 comprises a company fleet (e.g., all of the vehicles used by a company). In some embodiments, a company fleet is divided into vehicle groups (e.g., a first group formed by the vehicles associated with identifiers 1000-1004, a second group formed by the vehicles associated with identifiers 1005-1009, and a third group formed by the vehicles associated with identifiers 1010-1015). In some embodiments, vehicle groups are associated with divisions within a company (e.g., vehicles associated with a driving shift are assigned to a group, vehicles associated with a driving route are assigned to a group, vehicles delivering to a particular location are assigned to a group, etc.). In various embodiments, a probability of an event type being coachable is determined from historical data from a vehicle, from a group of vehicles, from a company fleet, or from any other appropriate collection of vehicles.

Figure 3:
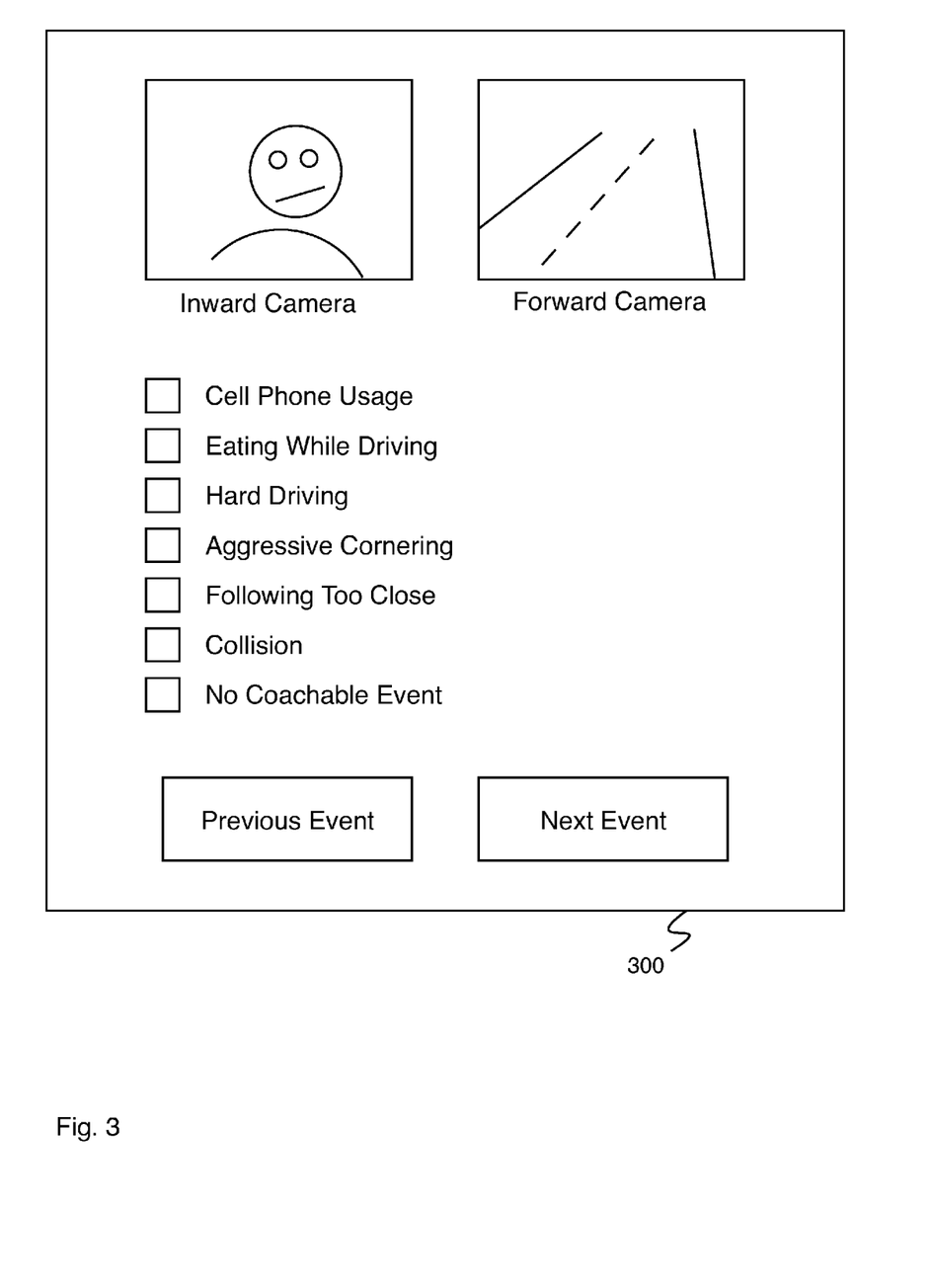
FIG. 3 is a diagram illustrating an embodiment of a user interface for a manual event reviewer.

FIG. 3 is a diagram illustrating an embodiment of a user interface for a manual event reviewer. In some embodiments, an event reviewer (e.g., a human) uses the user interface for the manual event reviewer to indicate coachability or to train coachability. In the example shown, user interface 300 comprises an inward camera display and a forward camera display. The inward camera display displays video from an inward-facing camera (e.g., facing the driver) and the forward camera display displays video from a forward-facing camera (e.g., facing the road ahead). In some embodiments, one of the inward camera display and the forward camera display does not display video (e.g., video data from only one camera is present). User interface 300 comprises a set of hazardous behavior checkboxes. In various embodiments, checkboxes comprise one or more of the following: for cell phone usage, eating while driving, hard driving, aggressive cornering, following too close, collision, no coachable event, and any other appropriate check boxes. In some embodiments, if an event reviewer checks any of the hazardous behavior checkboxes, the event is determined to be coachable. In some embodiments, the checkboxes that are checked by the reviewer determine the type of coaching determined to be necessary. User interface 300 additionally comprises a checkbox for no coachable event, to indicate that the event is not coachable. User interface 300 additionally comprises a previous event button to return to review of a previous event, and a next event button to begin review of a next event.

Figure 4:
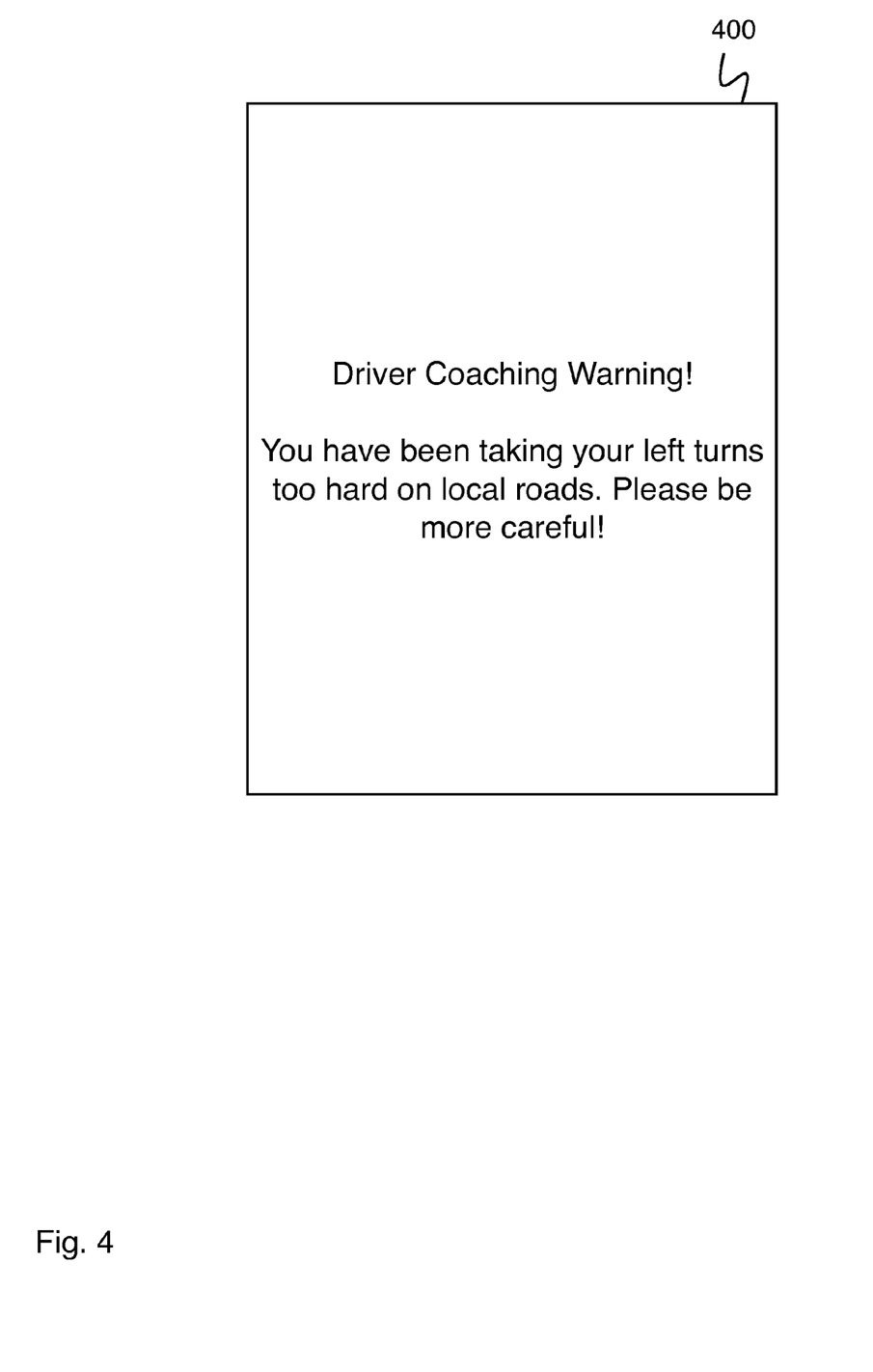
FIG. 4 is a diagram illustrating an embodiment of a driver coaching warning.

FIG. 4 is a diagram illustrating an embodiment of a driver coaching warning. In some embodiments, a driver coaching warning is provided to a driver in response to a determination that an anomalous event was coachable. In some embodiments, a driver coaching warning comprises an indication of a poor driver behavior. In the example shown, driver coaching warning 400 comprises a warning displayed to the driver (e.g., via an app on a mobile device). For example, a display indicates to a user "Driver Coaching Warning! You have been taking your left turns too hard on local roads. Please be more careful!" In various embodiments, a driver coaching warning is provided via a vehicle event recorder mounted in a vehicle, via an app on a mobile device, via a text delivery (e.g., email, text message, paper mail, etc.), via a supervisor (e.g., a driver coaching warning is provided to a supervisor and conveyed in person to the driver), or a driver coaching warning is provided in any other appropriate way.

Figure 5:
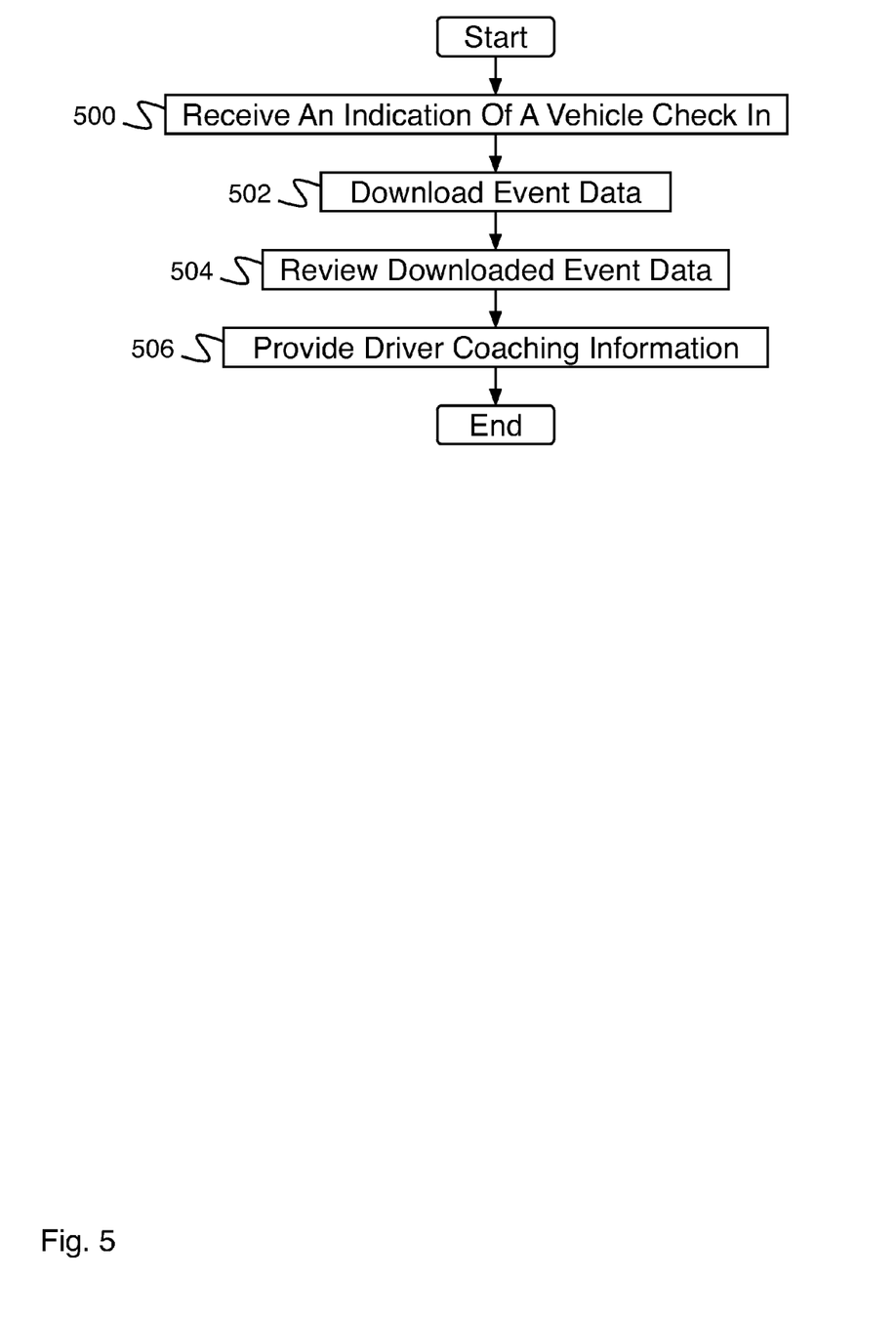

FIG. 5 is a flow diagram illustrating an embodiment of a vehicle event recorder check in. In some embodiments, the process of FIG. 5 is executed by a vehicle data server (e.g., back-end vehicle data server 104 of FIG. 1). In the example shown, in 500, an indication of a vehicle check in is received. In various embodiments, an indication of a vehicle check in comprises an indication that event data is available to be downloaded, an indication of a vehicle identifier, an indication of a driver identifier, or any other appropriate vehicle check in indication information. In some embodiments, an indication of a vehicle check in is provided by a vehicle event recorder. In some embodiments, an indication of a vehicle check in is provided when a vehicle is at a home station. In some embodiments, an indication of a vehicle check in is provided via a wireless connection. In 502, event data is downloaded. In some embodiments, the event data is downloaded for a subset of events determined in part by the probability that the event contains a coachable behavior calculated using historical coachable profiles. In some embodiments, downloading event data comprises downloading first event metadata (e.g., data describing event data) and determining events to download event data for. In some embodiments, downloading event data comprises downloading event video data. In 504, downloaded event data is reviewed. For example, the event data is reviewed to determine if the event is coachable. In various embodiments, event data is reviewed by an event reviewer at a reviewing station, by an automatic software program, by a committee, by a combination of human and software reviewers, or by any other appropriate reviewer. In some embodiments, the review process uses the expected probability that the event contains a coachable behavior calculated at least in part from historical coaching profiles to manage and prioritize the review of events (e.g., review first and/or more extensively events with higher probability of being coachable). In some embodiments, reviewing downloaded event data comprises determining driver coaching information. In 506, driver coaching information is provided. For example, a driver is provided coaching material, if appropriate. In various embodiments, driver coaching information is provided via a vehicle event recorder mounted in a vehicle, via an app on a mobile device, via a text delivery (e.g., email, text message, paper mail, etc.), via a supervisor (e.g., driver coaching information is provided to a supervisor and conveyed in person to the driver), or driver coaching information is provided in any other appropriate way.

Figure 6:
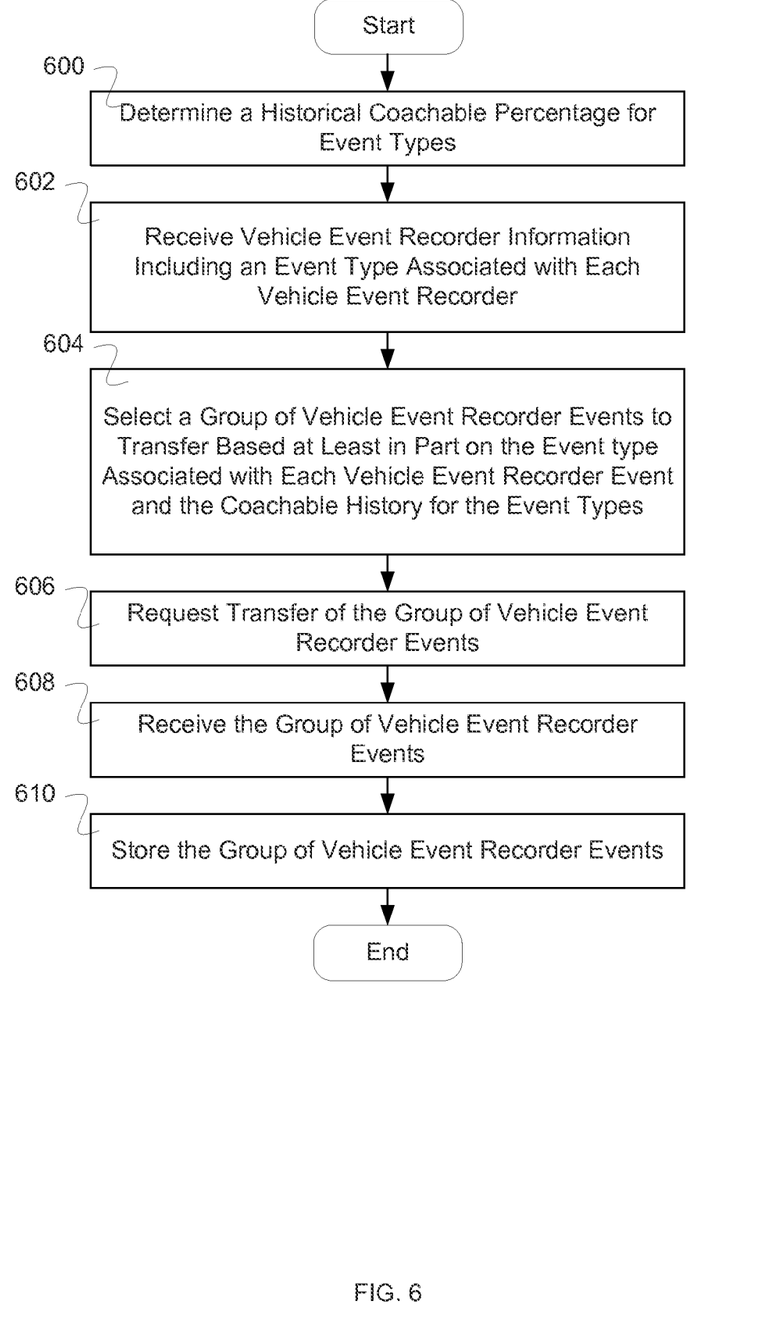
FIG. 6 is a flow diagram illustrating an embodiment of a process for downloading event data.

FIG. 6 is a flow diagram illustrating an embodiment of a process for downloading event data. In some embodiments, the process of FIG. 6 implements 502 of FIG. 5. In the example shown, in 600, a historical coachable percentage for event types is determined. For example, a historical coachable profile comprising historical coachable percentages for event types is determined from historical event data (e.g., data like shown in FIG. 2). In various embodiments, a historical coachable profile comprises a percentage of events for the vehicle determined to be coachable, a percentage of events for the vehicle group (e.g., a subgroup of vehicles within a company) determined to be coachable, a percentage of events for the vehicle company determined to be coachable, a percentage of events for the vehicle profile type determined to be coachable, a percentage of events for all companies determined to be coachable, a percentage of events determined by combining percentages of events from different collections of vehicles, or any other appropriate percentage of events. In some embodiments, a historical coachable profile or a coachable percentage is determined separately for each event type. In various embodiments, a historical coachable profile comprises one or more of the following: a percentage of coachable events for a vehicle, a vehicle group, a vehicle company, a vehicle profile type, a fleet overall, or any other appropriate percentage. In some embodiments, a historical coachable profile includes historical coachable percentages. In some embodiments, the historical coachable profile stores information gathered over different time periods. In various embodiments, the historical coachable profile comprises one or more of the following: a download volume for an individual driving behavior, for a vehicle, for a vehicle group, for a vehicle company, for a vehicle profile type, for the fleet overall, or any other appropriate data. In some embodiments, the system assesses a probability that an event contains a coachable behavior at least in part on a historical download volume and the historical coachable percentage for the event types.

In 602, vehicle event recorder information including an event type associated with each vehicle event recorder event is received. In some embodiments, vehicle event recorder information comprises event metadata. In various embodiments, event metadata includes one or more of the following: vehicle event recorder identifier, event identifier, event type, date, time, latitude, longitude, heading, speed, acceleration, software version of the algorithm that captured the event, or any other appropriate event metadata. In some embodiments, vehicle event recorder information comprises a set of event types and associated event counts (e.g., 2 hard driving events, 5 out of control events, 7 shock and erratic events, etc.). In some embodiments, vehicle event recorder information comprises a subset of event data for each event (e.g., accelerometer data but not video data).

In 604, a group of vehicle event recorder events to transfer is selected based at least in part on the event type associated with each vehicle event recorder event and the historical coachable history for the event types. In some embodiments, if a vehicle event recorder event is of a type that it determined to be more likely to be coachable, it is more likely to be downloaded. In various embodiments, a group of vehicle event recorder events to transfer is selected based at least in part on a fleet event type download capacity (e.g., target to download 2 shock and erratic events per vehicle event recorder per week), a vehicle download capacity (e.g., apply capacity caps to the number of events to download per event type per day—for example, download a maximum of 20 speed events per vehicle per day), a vehicle download history (e.g., request to transfer at least one event if no events have downloaded from this vehicle event recorder in the last 14 days), or any other appropriate information.

In some embodiments, historical coaching profiles are tables that store a summary Z of the outcome of reviewed events in a given population segment S during the last N days. Z includes the metrics:
  T=total number of events triggered per event type
  R=total number of events downloaded and reviewed per event type
  P=total number of events that showed a relevant behavior per event type, where relevant means coachable or useful to predict probability of future collision
  number of times each behavior was observed per event type
N is configurable and can depend on S. S includes:
  ER=event recorder (N=14 and 168 days)
  G=group (N=168 days)
  C=company (N=84 days)
  V=vehicle profile type (N=84 days)
  F=fleet (N=14 days)
Z and S could include other metrics or segment definitions.

In some embodiments, the information that is derived includes a probability that a new event contains at least one relevant behavior given the review history stored in the profiles (e.g., a formula for generating probability associated with a driving event to determine its likely usefulness in being coachable).

For example, assume that there is a new event of a given type, recorded by a given ER (e.g., vehicle event recorder), that belongs to a certain G and C and is installed in a vehicle class V. From the historical coaching profiles, the following counts are extracted:
  $P(ER,14)$=total number of events that showed a relevant behavior in this ER during the last 14 days
  $R(ER,14)$=total number of events reviewed in this ER during the last 14 days
  $P(ER,168)$=total number of events that showed a relevant behavior in this ER during the last 168 days
  $R(ER,168)$=total number of events reviewed in this ER during the last 168 days
  $P(G,168)$=total number of events that showed a relevant behavior in this G during the last 168 days
  $R(G,168)$=total number of events reviewed in this G during the last 168 days
  $P(C,84)$=total number of events that showed a relevant behavior in this C during the last 84 days
  $R(C,84)$=total number of events reviewed in this C during the last 84 days
  $P(V,84)$=total number of events that showed a relevant behavior in this V during the last 84 days
  $R(V,84)$=total number of events reviewed in this V during the last 84 days
  $P(F,14)$=total number of events that showed a relevant behavior in the fleet during the last 14 days
  $R(F,84)$=total number of events reviewed in the fleet during the last 14 days Note that for all S and N, it is satisfied that $P(S,N) < R(S,N)$ as the events that showed a relevant behavior are a subset of the events reviewed.

In some embodiments, the formula adopted to estimate the probability that this event contains a relevant behavior given its type is:

$$\text{Probability} = \frac{1}{1 + e^{-SUM}}$$

with $$SUM = a0 + a1*v1 + a2*v2 + a3*v3 + a4*v4 + a5*v5$$

where v1 to v5 are features that estimate the probability from different combinations of segment S and time frame N available in the historical coaching profiles, and a0 to a5 are coefficients fit from historical data. The features are approximated as:

$v1 = (P(ER,14) + b)/(R(ER,14) + c)$, probability from $S=ER$ during $N=14$ days $v2 = (P(ER,168) + b)/(R(ER,168) + c)$, probability from $S=ER$ during $N=168$ days $v3 = (P(G,168) + b)/(R(G,168) + c)$, probability from $S=G$ during $N=168$ days $v4 = (P(C,84) + b)/(R(C,84) + c)$, probability from $S=C$ during $N=84$ days $v5 = (P(V,84) + b)/(R(V,84) + c)$, probability from $S=V$ during $N=84$ days where the coefficients b and c are defined so that v exactly matches the probability estimated in two special common cases: 1) R=0, P=0 (i.e., no prior event is available); and 2) R=1, P=0 (i.e., only one prior event is available and was not coachable). The calculation of b and c is as follows:

$bo = \text{sum}(P(ER,168))/\text{sum}(R(ER,168))$, where the sums are performed over all ERs that currently show $R(ER,14)=0$ in the table (i.e., estimates the probability of a new event being coachable given no event was reviewed in the last 14 days)

$co=\text{sum}(P(ER,168))/\text{sum}(R(ER,168))$, where the sums are performed over all ERs that currently show $R(ER,14)=1$ and $P(ER,14)=0$ in the table (i.e., estimates the probability of a new event being coachable given only one event was reviewed in the last 14 days and it turned out non coachable)

$b=\text{abs}((bo*co)/(bo-co))$ $c=\text{abs}(co/(bo-co))$

For example, if $R(C,84)=P(C,84)=0 \Rightarrow v4=b/c \Rightarrow v4=bo$, or if $R(C,84)=1$ and $P(C,84)=0 \Rightarrow v4=b/(1+c) \Rightarrow v4=co$. Note that b and c change over time as the counts in Historical Risk Profile Tables change over time (e.g., the counts in table 200 of FIG. 2. can be updated daily). In one example using Shock and Erratic event type, a0 to a5 are static and are derived by fitting using supervised training from 1 year of historical data (e.g., a database including 8.2 million events). Each event Risk Profile value (e.g., P,R for different S and N) has been generated based on historical data, and v1 to v5 were computed from the Risk Profile values. For each event, the target was set to 1 in the event that the event contained at least one relevant behavior, and 0 otherwise. The values fitted were:

a0=−3.363343
a1=2.153274
a2=1.830853
a3=2.234459
a4=0.298388
a5=1.468879

In some embodiments, similar formulas are derived for other event types once sufficient data becomes available and significant counts are observed in the Risk Profiles for the each segment ER, G, C and V.

In some embodiments, event types that do not contain significant counts on the segments ER, G, C and V estimate the probability that a new event on the type contains a coachable behavior using fleet counts: Probability=$P(F,14)/R(F,14)$.

In 606, transfer of the group of vehicle event recorder events is requested. In some embodiments, requesting transfer of the group of vehicle event recorder events comprises providing an indication of the group of vehicle event recorder events. For example, a list of events by event identifier is provided to the vehicle event recorder with an indication requesting the transfer of the appropriate events to the back-end server.

In 608, the group of vehicle event recorder events is received. For example, receiving a group of vehicle event recorder events comprises receiving event data for each of the group of vehicle event recorder events at the server from the vehicle event recorder via a wireless or wired network.

In 610, the group of vehicle event recorder events is stored (e.g., in a data storage that is connected to or is part of the server).

Figure 7:
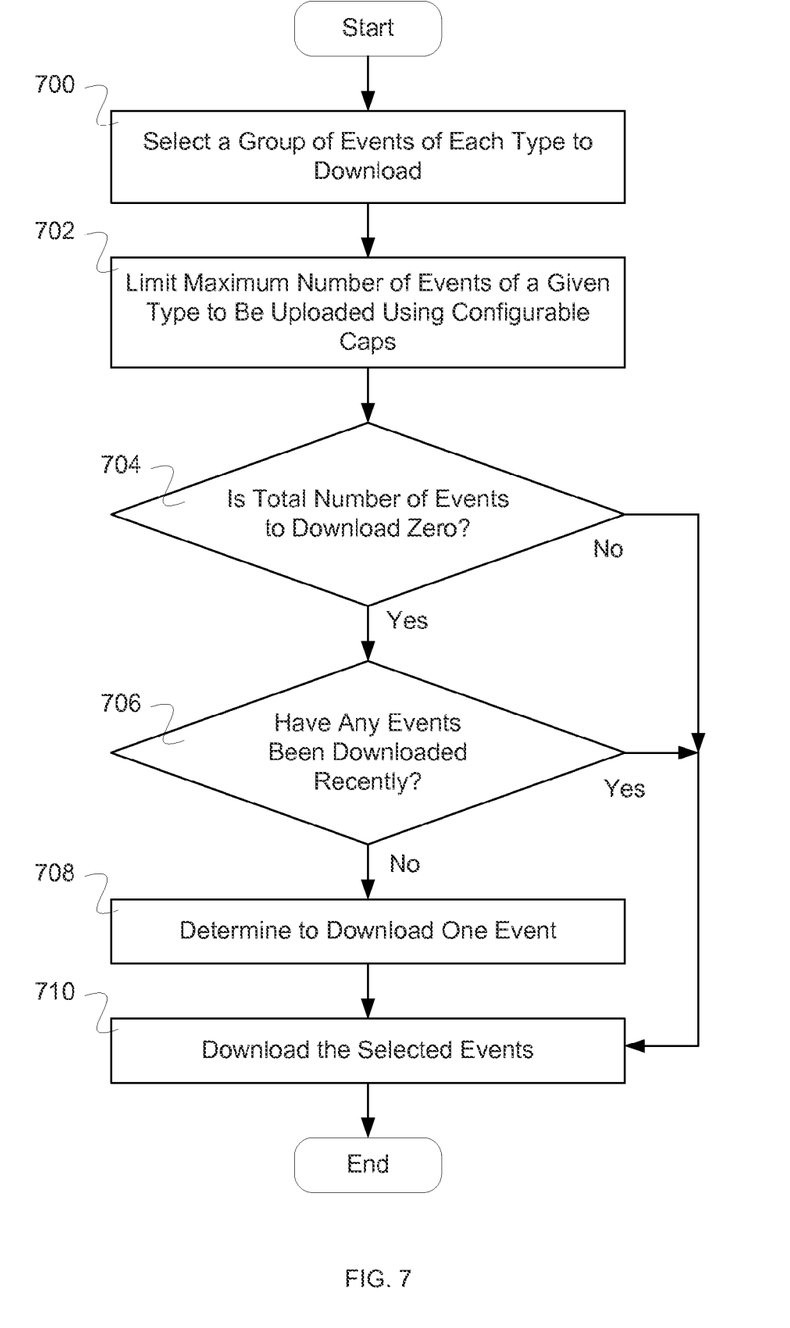
FIG. 7 is a flow diagram illustrating an embodiment in which two additional controls are used to decrease or increase the number of events to download.

FIG. 7 is a flow diagram illustrating an embodiment in which two additional controls are used to decrease or increase the number of events to download. In the example shown, in 700 a group of events of each type have been selected for download. In some embodiments, 700 implements 604 of FIG. 6. In 702, configurable caps are used to limit the maximum number of events of a given type to be uploaded (e.g., download a maximum of 25 lane departure events per day). In some embodiments, this process protects from malfunctions of the vehicle event recorder that would result in a large number of events being recorded. In 704, it is determined whether the total number of events to download is zero. In the event that it is determined that the total number of events to download is not zero, control passes to 710. In the event that it is determined that the total number of events to download is zero, control passes to 706. In 706, it is determined whether any events have been downloaded recently. For example, it is determined whether any events have been downloaded recently from the download history available in the historical coachable profiles. In some embodiments, determining whether any events have been downloaded recently comprises determining whether one or more events have been downloaded within a threshold time period (e.g., one day, one week, one month, etc.). In the event that it is determined that any events have been downloaded recently, control passes to 710. If it is determined that no events have been downloaded recently, control passes to 708. In 708, it is determined to download one event. For example, it is determined to download one event as opposed to zero events. In some embodiments, it is determined to download one event of the event type with the highest coachable percentage. In 710, the selected events are downloaded. For example, the determined number of events of each type are selected.

Figure 8:
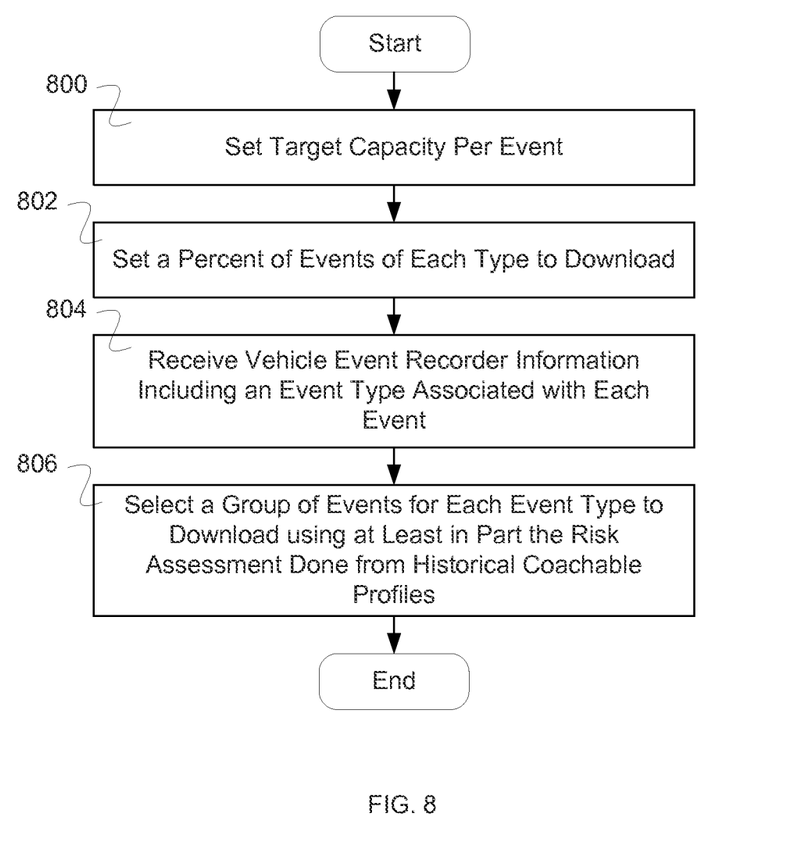
FIG. 8 is a flow diagram illustrating an embodiment of a process to select a group of vehicle event recorder events to transfer.

FIG. 8 is a flow diagram illustrating an embodiment of a process to select a group of vehicle event recorder events to transfer. In some embodiments, the vehicle event recorder events to transfer are based at least in part on the event type associated with each event and the historical coachable percentage for the event types. In some embodiments, FIG. 8 implements 604 of FIG. 6. In some embodiments, where different event types are tailored to attempt to capture different types of coachable behaviors (e.g., shock and erratic events target possible collisions among other, speeding events target speed infractions, lane departure events target distractions, etc.), it is important to download a fraction of each event type to maintain behavior coverage (e.g., it is desired to coach drivers to prevent collisions, speed infractions, distractions and all risky behaviors). In 800, a target capacity is set per event. For example, a target download capacity is set for each event type (e.g., target to download in average 2 shock and erratic events, 2 speed events, 1 hard driving event, and/or 1 lane departure event per vehicle event recorder per week, etc.). In 802, given the observed triggering volume, the download capacity is translated into a percentage of triggered events to download for each event type. In 804, vehicle event recorder information is received including an event type associated with each event. For example, the event recorder checks in and event information is received by the back-end server. In 806, a group of events is selected for each event type to download using at least in part the risk assessment done from historical coachable profiles. For example, a percent of events of each event type is selected for download. In some embodiments, the riskier events of a given event type are selected using the risk assessment derived at least in part from the historical coachable profiles. In some embodiments, the events of a given type are selected randomly. In some embodiments, the events of a given type are selected based at least in part on event data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for transferring data, comprising:
   an input interface configured to:
      receive event information from a vehicle event recorder including an event type for each event associated with the event information; and
   a processor configured to:
      determine a historical coachable profile for event types associated with the event information, wherein the historical coachable profile comprises one or more of the following: a download volume and percentage of coachable events for a vehicle, a vehicle group, a vehicle company, a vehicle profile type, and a fleet overall; and
      select a group of events to transfer based at least in part on the historical coachable profile for the event types.

2. The system of claim 1, wherein the historical coachable profile stores information gathered over different time periods.

3. A system for transferring data, comprising:
   an input interface configured to:
      receive event information from a vehicle event recorder including an event type for each event associated with the event information; and
   a processor configured to:
      determine a historical coachable profile for event types associated with the event information;
      select a group of events to transfer based at least in part on the historical coachable profile for the event types; and
      assess a probability that an event contains a coachable behavior at least in part on a historical download volume and a historical coachable percentage for the event types.

4. A system for transferring data, comprising:
   an input interface configured to:
      receive event information from a vehicle event recorder including an event type for each event associated with the event information; and
   a processor configured to:
      determine a historical coachable profile for event types associated with the event information; and
      select a group of events to transfer based at least in part on the historical coachable profile for the event types, wherein a number in the group of events is decreased in the event that the number of events is above a threshold.

5. A system for transferring data, comprising:
   an input interface configured to:
      receive event information from a vehicle event recorder including an event type for each event associated with the event information; and
   a processor configured to:
      determine a historical coachable profile for event types associated with the event information; and
      select a group of events to transfer based at least in part on the historical coachable profile for the event types, wherein a number in the group of events is increased in the event that a vehicle download history comprises no events.

6. A system for transferring data, comprising:
   an input interface configured to:
      receive event information from a vehicle event recorder including an event type for each event associated with the event information; and
   a processor configured to:
      determine a historical coachable profile for event types associated with the event information; and
      select a group of events to transfer based at least in part on the historical coachable profile for the event types, wherein the group of events to transfer is determined based at least in part on a number of events of each event type of the received event information.

7. A system for transferring data, comprising:
   an input interface configured to:
      receive event information from a vehicle event recorder including an event type for each event associated with the event information; and
   a processor configured to:
      determine a historical coachable profile for event types associated with the event information; and
      select a group of events to transfer based at least in part on the historical coachable profile for the event types, wherein a specific event of a given event type in the group of events is selected randomly.

8. The system of claim 1, wherein a specific event of a given event type in the group of events is selected based at least in part on event information.

9. The system of claim 1, wherein the processor is further configured to request transfer of a group of events or all events.

10. The system of claim 1, wherein the processor is further configured to store the events transferred.

11. The system of claim 1, wherein the processor is further configured to allow review of the transferred events and select a group of events for coaching.

12. A method for transferring data, comprising:
   receiving event information from a vehicle event recorder including an event type for each event associated with the event information; and
   determining, using a processor, a historical coachable profile for event types associated with the event information, wherein the historical coachable profile comprises one or more of the following: a download volume and percentage of coachable events for a vehicle, a vehicle group, a vehicle company, a vehicle profile type, and a fleet overall; and
   selecting a group of events to transfer based at least in part on the historical coachable profile for the event types.

13. A computer program product for transferring data, the computer program product being embodied in a non-transitory computer readable storage medium and comprising computer instructions for:
   receiving event information from a vehicle event recorder including an event type for each event associated with the event information; and
   determining, using a processor, a historical coachable profile for event types associated with the event information, wherein the historical coachable profile comprises one or more of the following: a download volume and percentage of coachable events for a vehicle, a vehicle group, a vehicle company, a vehicle profile type, and a fleet overall; and
   selecting a group of events to transfer based at least in part on the historical coachable profile for the event types.

14. A method for transferring data, comprising:
   receiving event information from a vehicle event recorder including an event type for each event associated with the event information; and
   determining, using a processor, a historical coachable profile for event types associated with the event information;

selecting a group of events to transfer based at least in part on the historical coachable profile for the event types; and assessing a probability that an event contains a coachable behavior at least in part on a historical download volume and a historical coachable percentage for the event types.

15. A method for transferring data, comprising:

receiving event information from a vehicle event recorder including an event type for each event associated with the event information; and a processor configured to:

determining, using a processor, a historical coachable profile for event types associated with the event information; and selecting a group of events to transfer based at least in part on the historical coachable profile for the event types, wherein a number in the group of events is decreased in the event that the number of events is above a threshold.

16. A method for transferring data, comprising:

receiving event information from a vehicle event recorder including an event type for each event associated with the event information; and determining, using a processor, a historical coachable profile for event types associated with the event information; and selecting a group of events to transfer based at least in part on the historical coachable profile for the event types, wherein a number in the group of events is increased in the event that a vehicle download history comprises no events.

17. A method for transferring data, comprising:

receiving event information from a vehicle event recorder including an event type for each event associated with the event information; and determining, using a processor, a historical coachable profile for event types associated with the event information; and selecting a group of events to transfer based at least in part on the historical coachable profile for the event types, wherein the group of events to transfer is determined based at least in part on a number of events of each event type of the received event information.

18. A method for transferring data, comprising:

receiving event information from a vehicle event recorder including an event type for each event associated with the event information; and determining, using a processor, a historical coachable profile for event types associated with the event information; and selecting a group of events to transfer based at least in part on the historical coachable profile for the event types, wherein a specific event of a given event type in the group of events is selected randomly.

19. A method for transferring data, comprising:

receiving event information from a vehicle event recorder including an event type for each event associated with the event information; and a processor configured to:

determining, using a processor, a historical coachable profile for event types associated with the event information; and selecting a group of events to transfer based at least in part on the historical coachable profile for the event types; and prioritizing and managing a queue of events transferred for review based on a probability that the events transferred contain a coachable behavior determined at least in part using a historical coachable profile.

20. A computer program product for transferring data, the computer program product being embodied in a non-transitory computer readable storage medium and comprising computer instructions for:

receiving event information from a vehicle event recorder including an event type for each event associated with the event information; and determining, using a processor, a historical coachable profile for event types associated with the event information;

selecting a group of events to transfer based at least in part on the historical coachable profile for the event types; and assessing a probability that an event contains a coachable behavior at least in part on a historical download volume and a historical coachable percentage for the event types.

21. A computer program product for transferring data, the computer program product being embodied in a non-transitory computer readable storage medium and comprising computer instructions for:

receiving event information from a vehicle event recorder including an event type for each event associated with the event information; and a processor configured to:

determining, using a processor, a historical coachable profile for event types associated with the event information; and selecting a group of events to transfer based at least in part on the historical coachable profile for the event types, wherein a number in the group of events is decreased in the event that the number of events is above a threshold.

22. A computer program product for transferring data, the computer program product being embodied in a non-transitory computer readable storage medium and comprising computer instructions for:

receiving event information from a vehicle event recorder including an event type for each event associated with the event information; and determining, using a processor, a historical coachable profile for event types associated with the event information; and selecting a group of events to transfer based at least in part on the historical coachable profile for the event types, wherein a number in the group of events is increased in the event that a vehicle download history comprises no events.

23. A computer program product for transferring data, the computer program product being embodied in a non-transitory computer readable storage medium and comprising computer instructions for:

receiving event information from a vehicle event recorder including an event type for each event associated with the event information; and determining, using a processor, a historical coachable profile for event types associated with the event information; and selecting a group of events to transfer based at least in part on the historical coachable profile for the event types, wherein the group of events to transfer is determined based at least in part on a number of events of each event type of the received event information.

24. A computer program product for transferring data, the computer program product being embodied in a non-transitory computer readable storage medium and comprising computer instructions for:
- receiving event information from a vehicle event recorder including an event type for each event associated with the event information; and
- determining, using a processor, a historical coachable profile for event types associated with the event information; and
- selecting a group of events to transfer based at least in part on the historical coachable profile for the event types, wherein a specific event of a given event type in the group of events is selected randomly.

25. A computer program product for transferring data, the computer program product being embodied in a non-transitory computer readable storage medium and comprising computer instructions for:
- receiving event information from a vehicle event recorder including an event type for each event associated with the event information; and a processor configured to:
- determining, using a processor, a historical coachable profile for event types associated with the event information; and
- selecting a group of events to transfer based at least in part on the historical coachable profile for the event types; and
- prioritizing and managing a queue of events transferred for review based on a probability that the events transferred contain a coachable behavior determined at least in part using a historical coachable profile.

* * * * *